Sept. 14, 1943.  C. W. GINTER  2,329,604
FLUID METER
Filed July 14, 1941
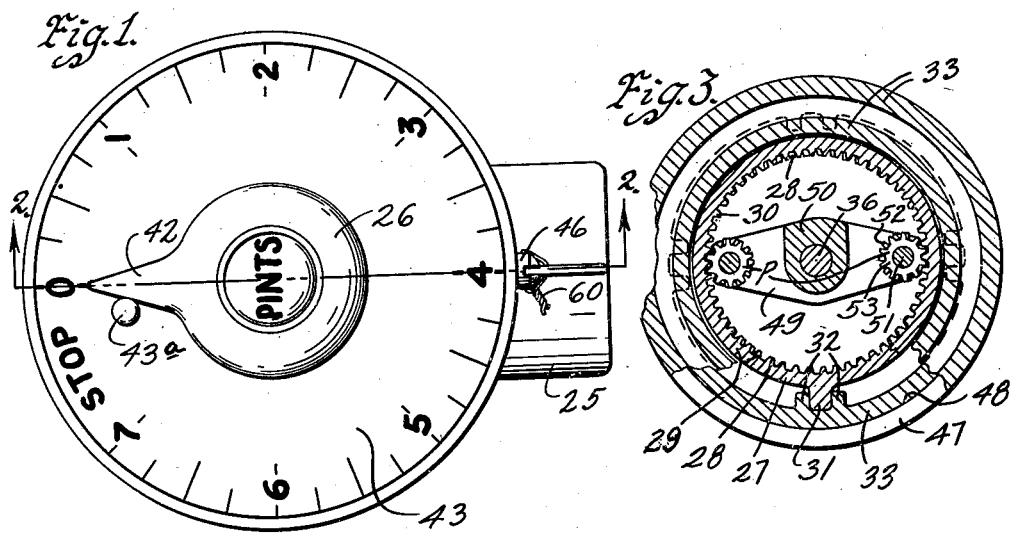
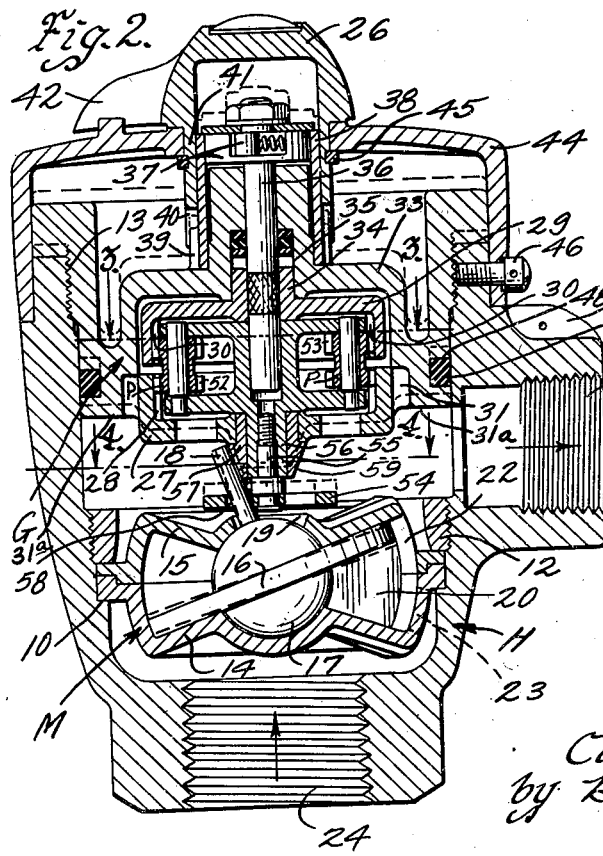
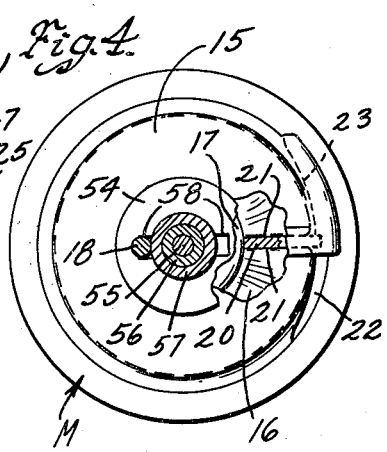
Inventor
Charles W. Ginter
by Bair & Freeman
Attorneys Patented Sept. 14, 1943

2,329,604

UNITED STATES PATENT OFFICE 2,329,604

FLUID METER

Charles W. Ginter, Bryan, Ohio, assignor to The Aro Equipment Corporation, Bryan, Ohio, a corporation of Ohio Application July 14, 1941, Serial No. 402,333

6 Claims. (Cl. 73—258)

My present invention relates to a fluid meter for grease or the like having a gearing mechanism therein and a novel means of adjusting the meter for accuracy of volume of fluid delivered with respect to that indicated on the dial of the meter.

One object of the invention is to provide a meter assembly which is comparatively simple and inexpensive to construct.

Another object is to provide a meter wherein a simple floating adjustment for a gearing assembly may be utilized as a means of matching the delivery of the meter with the calibrations thereon without the necessity of changing gears to accomplish this purpose.

A further object is to provide an adjusting means which may be adjusted within certain limits to any point intermediate such limits, thereby providing flexibility of adjustment impossible of attainment where gears with different numbers of teeth are interchanged, and which therefore provides for adjustment only in steps corresponding to the teeth.

Still a further object is to provide a simple adjusting means particularly adaptable for a meter having a nutating type of motor assembly therein.

Still another object is to make provision for effectively sealing the adjustable gearing assembly with relation to the housing of the meter in all positions of adjustment and a type of connection between the gearing mechanism and the indicating mechanism of the meter, which remains operative in all positions of adjustment of the gearing mechanism.

With these and other objects in view, my invention with respect to its features which I believe to be novel and patentable will be pointed out in the claims appended hereto. For a better detailed understanding of the invention, and further objects relating to details of economy of my invention, reference is made to the following description and to the accompanying drawing wherein such further objects will definitely appear, and in which Figure 1 is a plan view of a fluid meter embodying my invention;

Figure 2 is a vertical sectional view thereof on the line 2—2 of Figure 1;

Figure 3 is a horizontal sectional view on the line 3—3 of Figure 2, omitting the housing, and Figure 4 is a sectional view on the line 4—4 of Figure 2, omitting the housing and showing a plan view of the motor assembly.

On the accompanying drawing, I have used the reference character H to indicate generally a housing. Within the housing H, a motor assembly indicated at M and a gearing assembly indicated at G are mounted. The motor assembly M seats against a shoulder 10 and is retained in position by a screw-threaded retainer ring 12. The gearing assembly G is threaded as indicated at 13 in the housing H, whereby it may be vertically adjusted therein.

The motor assembly M is one of the well-known nutating type, having lower and upper casing members 14 and 15 providing a chamber for a wobble plate 16. The wobble plate 16 is formed around a ball center 17 from which a wobble pin 18 extends through an opening 19 in the top of the casing part 15.

The wobble plate chamber has a partition plate 20 therein and the plate 16 is notched, the sides of the notches being indicated at 21 in Figure 4 to straddle the partition plate 20.

An outlet opening 22 is provided in the upper casing part 15. An inlet 23 communicates with a fluid inlet 24 of the housing H, while the outlet 22 communicates with an outlet 25 of the housing H. The outlet 22 and the inlet 23 are disposed on opposite sides of the partition plate 20. When grease or other fluid enters at 24, it passes through the motor assembly M, imparting to the wobble plate 16 a nutating motion, and finally passes out through the outlet 25. The grease during its passage, and in operating the motor, effects a wobble movement of the pin 18 with the number of revolutions thereof being proportionate to the volume of grease passing through the motor.

The gearing assembly G serves as a means to transmit the motion of the wobble pin 18 to an indicator knob 26 at a greatly reduced speed. For this purpose, the gearing assembly includes a stationary internal gear 27 having teeth 28 and a driven internal gear 29 having teeth 30. The gear 27 is supported by four lugs 31 located between four pairs of lugs 32 formed in the bottom of a gear casing 33, which is in the form of an adjusting nut for the gearing assembly G and has the threads 13 formed thereon. The gear casing is peened or swedged at four points indicated at 31ª adjacent each lug 31 to retain the lugs in position.

The driven gear 29 has a tubular stem 34 rotatable in a bore 35 of the gear casing 33. An operating stem 36 is secured therein as by a knurled fit in the gear 29, the gear being a die casting. The stem 36 has a "free wheeling" assembly 37 on its upper end for driving a sleeve 38 in one direction (clockwise in Figure 1), but permitting the sleeve to be rotated manually in the opposite direction. The sleeve carries a plurality of lugs 39 adapted to coact with slots 40 of another sleeve 41 forming a downward extension of the indicating knob 26. Thus the stem 36, when rotating clockwise, rotates the knob 26 with it to swing an indicating pointer 42 thereof around a dial 43 for indicating pints or other units of measure for the fluid passing through the meter. After the desired number of pints has been delivered, the knob 26 can be rotated counterclockwise, as permitted by the free wheeling unit 37, to its initial zero position against a stop pin 43ª.

The knob 26 is carried by a cover 44 and is retained in position relative thereto by a retainer ring 45. The cover 44 is retained in position by a screw 46 which serves also as a set screw to retain the gear casing or adjusting nut 33 in any position to which it is adjusted. To prevent leakage of fluid from the housing between the casing 33 and the interior wall of the housing, a sealing ring of rubber or the like 47 is compressed into a groove 48 of the casing 33.

An operative connection is provided between the wobble pin 18 and the driven gear 29 in the form of a carriage 49 consisting of a pair of arms having a hub 50 rotatable on the lower end of the stem 36. The arms 49 carry pintles 51 on which are rotatably mounted pinions P. The pinions P are provided with first and second sets of teeth 52 and 53, respectively. These teeth vary in number by one. By way of example, there may be eleven teeth 52 and twelve teeth 53.

The pinion teeth 52 mesh with the gear teeth 28 of the stationary gear 27. The pinion teeth 53 mesh with the gear teeth 30 of the driven gear 29. The teeth 28 and 30 are also different in number, there being, for example, a total of fifty-seven teeth 28 in the gear 27 and a total of sixty-two teeth 30 in the gear 29. The suggested relationships of number of teeth results in a gear reduction of 341 to 1.

For rotating the carriage 49, I provide a disc 54 riveted to a threaded stud 55 which is threaded into a downwardly extending tubular stem 56 of the carriage. The stem 56 rotates in a bushing 57 of steel or the like, which is supported by the stationary gear 27. The disc 54 has a pair of slots 58, one of which receives the wobble pin 18 thrust upwardly therethrough. The bushing 57 has a cone surface 59 against which the side of the pin engages. Accordingly, the wobble pin is confined against outward movement by the slot 58 and against inward movement by the cone surface 59 with respect to the axis of rotation.

The gearing mechanism which I have described is obviously quite simple in construction and readily assembled. It eliminates a gear train consisting of many gears to secure the great gear reduction necessary. I have also eliminated the necessity of providing gears of different sizes, to make it possible to adjust the meter for accurate fluid delivery through the meter with respect to indicated delivery on the dial 43. This consists of making the gearing assembly G adjustable, as already described. One such adjustment is illustrated in Figure 2 by solid lines, this adjustment being for maximum fluid delivery, in proportion to movement of the indicator knob 26. If such fluid delivery is greater than indicated, the cover 44 and knob 26 may be readily removed by removing the set screw 46 and the nutlike gear casing G may then be unscrewed as to the dotted position illustrated. This shifts the disc 54 and the cone surface 59 upwardly so that the wobble pin 18 then travels in a circle of less diameter and the wobble plate 16 does not have quite as great a throw. Accordingly, each cycle of revolution will be effected by passage of a smaller volume of fluid through the motor assembly M. Obviously, the assembly G may be adjusted to the proper height to secure an accurate flow of fluid with respect to the calibration of the meter at any point intermediate the limits of adjustment. Due to the screw-threaded arrangement at 13, a micrometric adjustment is possible.

The sealing ring 47 serves as a seal in any adjusted position and the slidable connection at 39—40 permits adjustment, yet proper operation of the indicating knob 26 when the cover 44 is again placed in position. Ordinarily, the adjustment feature described is for the purpose of accurately calibrating the meter at the factory before the meter is sold. After calibration, the set screw 46 is tightened in position and a wire seal 60 is passed through the head of the screw and through a web 61 on the outlet boss 25.

The adjustment feature in connection with a meter is quite important because there are certain machining variations that must necessarily be permissible in manufacture, and to compensate for these variations a means must be provided to give greater speed or less speed of the indicating mechanism, as the condition may require. It is therefore evident that an adjustable meter having an infinite number of adjustments is preferred over one of step adjustment, a limitation in connection with change gear adjustments.

Some changes may be made in the construction and arrangement of the parts of my device without departing from the real spirit and purpose of my invention, and it is my intention to cover by my claims any modified forms of structure or use of mechanical equivalents which may be reasonably included within their scope without sacrificing any of the advantages thereof.

I claim as my invention:

1. In a fluid meter, a housing, a nutating type motor assembly therein including a wobble pin, a gearing assembly screw-threaded in said housing and having a rotary and axially slidable connection with said wobble pin, indicating mechanism operated by said gearing assembly, said gearing assembly being operable when rotated relative to said housing to effect adjustment of the gearing assembly toward and away from said motor assembly to change the throw of said wobble pin and thereby vary the volume of fluid through said motor assembly per cycle of revolution thereof, and a sealing ring interposed between said gearing assembly and the interior wall of said housing to seal said gearing assembly against fluid exit from said housing in the various adjusted positions of said gearing assembly, said indicating mechanism having an axially slidable connection with said gearing assembly to permit continuance of the operative connection between said gearing assembly and said indicating mechanism in the different adjusted positions of the gearing assembly.

2. In a fluid meter of the class disclosed, a housing, a motor assembly therein including a wobble pin, a gearing assembly screw-threaded in said housing and having a rotary and axially slidable connection with said wobble pin, indicating mechanism operated by said gearing assembly, said gearing assembly being operable when rotated relative to said housing to effect adjustment of the gearing assembly toward and away from said motor assembly to change the throw of said wobble pin and thereby vary the volume of fluid through said motor assembly per cycle of revolution thereof, and sealing means for said gearing assembly relative to said housing in the various adjusted positions of said gearing assembly.

3. In a meter of the class disclosed, a housing, a motor assembly therein including a wobble pin, a gearing assembly in said housing and having a rotary and axially slidable connection with said wobble pin, and indicating mechanism operated by said gearing assembly, said gearing assembly being movable in said housing to effect adjustment of the gearing assembly toward and away from said motor assembly to change the throw of said wobble pin and thereby vary the volume of fluid through said motor assembly per cycle of revolution thereof and means to seal said gearing assembly relative to said housing in the various positions of adjustment thereof.

4. In a fluid meter, a housing, a nutating type motor assembly therein including an actuating pin inclined relative to the axis of nutation of the motor, a gearing assembly in said housing and having a perforated disc slidably and rotatably receiving said actuating pin, means for shifting said gearing assembly toward or away from said motor assembly to change the throw of said actuating pin and thereby vary the volume of fluid through said motor assembly per cycle, and means to seal said gearing assembly in said housing.

5. In a fluid meter, a housing, a motor assembly therein including a wobble pin and a nutation disc connected therewith, a gearing assembly screw-threaded in said housing and having a perforated disc connection with said wobble pin, indicating mechanism operated by said gearing assembly, said gearing assembly being operable when revolved relative to said housing to effect adjustment of the gearing assembly toward and away from said motor assembly to change the position of the perforation of said perforated disc longitudinally of said wobble pin and thereby change the throw of said wobble pin and said nutation disc to vary the volume of fluid through said motor assembly per cycle of operation thereof, said gearing assembly comprising a stationary gear, a driven gear, said gears being axially aligned and having a different number of teeth, a pinion carriage connected with said perforated disc for rotation thereby, a pinion carried by said pinion carriage and having first and second sets of teeth meshing respectively with said stationary gear and said driven gear, said first and second sets of teeth differing in number whereby planetary rotation of said pinion relative to said stationary gear produces rotation of said driven gear at a greatly reduced speed with respect to the rotation of said carriage, said indicating mechanism being connected with said driven gear.

6. In a fluid meter, a housing, a nutating type motor assembly therein having a casing, a nutation disc therein, and a wobble pin, an indicating mechanism assembly mounted for bodily movement in said housing, a rotatable disc for driving said indicating mechanism assembly, said rotatable disc having an opening spaced from the center of rotation thereof to receive said wobble pin, said indicating mechanism assembly upon such bodily movement relative to said housing adjusting said rotatable disc toward and away from said motor assembly to change the position of said opening of said rotatable disc longitudinally of said wobble pin and thereby change the throw of said wobble pin and the throw of said nutation disc in said casing of said assembly to vary the volume of fluid passed through the motor assembly per cycle of operation thereof.

CHARLES W. GINTER.